US007286661B1

(12) United States Patent
Balk et al.

(10) Patent No.: US 7,286,661 B1
(45) Date of Patent: Oct. 23, 2007

(54) SYSTEMS AND METHODS FOR SCALABLE HUNT-GROUP MANAGEMENT

(75) Inventors: Igor Balk, Brighton, MA (US); David Michael Choupak, Cupertino, CA (US)

(73) Assignee: Unison Technologies LLC, New York, NY (US)

( * ) Notice: Subject to any disclaimer, the term of this patent is extended or adjusted under 35 U.S.C. 154(b) by 0 days.

(21) Appl. No.: 11/743,088

(22) Filed: May 1, 2007

(51) Int. Cl.
| | |
|---|---|
| H04M 3/523 | (2006.01) |
| H04M 3/58 | (2006.01) |
| G06F 15/16 | (2006.01) |
| H04Q 3/64 | (2006.01) |

(52) U.S. Cl. .............. 379/265.01; 370/270; 370/390; 370/395.2; 379/212.01; 379/265.02; 709/227; 709/228

(58) Field of Classification Search .......... 370/270, 370/390, 395.2; 379/111, 211.01–214.01, 379/219–221.01, 221.03, 231–234, 265.01, 379/265.02, 265.09; 455/417, 445; 709/227, 709/228

See application file for complete search history.

(56) References Cited

U.S. PATENT DOCUMENTS

| 1,479,442 | A | | 1/1924 | Aldendorff ................. 379/111 |
|---|---|---|---|---|
| 3,221,107 | A | | 11/1965 | Seemann et al. ............. 179/18 |
| 3,479,465 | A | | 11/1969 | Masucci ....................... 179/18 |
| 4,953,159 | A | | 8/1990 | Hayden et al. ............... 370/62 |
| 5,012,511 | A | | 4/1991 | Hanle et al. ................ 379/211 |
| 5,060,255 | A | | 10/1991 | Brown ......................... 379/67 |
| 5,309,513 | A | * | 5/1994 | Rose ...................... 379/265.12 |
| 5,335,269 | A | * | 8/1994 | Steinlicht ............... 379/266.05 |
| 5,515,428 | A | | 5/1996 | Sestak et al. ................ 379/266 |
| 5,557,667 | A | | 9/1996 | Bruno et al. ................. 379/201 |
| 5,654,961 | A | | 8/1997 | Araujo et al. ................ 370/263 |
| 5,696,809 | A | | 12/1997 | Voit .............................. 379/5 |
| 5,740,237 | A | | 4/1998 | Malik et al. ................. 379/211 |
| 6,069,949 | A | | 5/2000 | Schuenhoff et al. ......... 379/242 |
| 6,208,658 | B1 | | 3/2001 | Pickett ......................... 370/401 |
| 6,285,752 | B1 | | 9/2001 | Rice ...................... 379/266.07 |
| 6,404,747 | B1 | | 6/2002 | Berry et al. ................. 370/270 |

(Continued)

FOREIGN PATENT DOCUMENTS

EP          0510411          3/1992

(Continued)

OTHER PUBLICATIONS

Bond, "An open architecture for next-generation telecommunication services [instant messaging]," ACM Transactions on Internet Technology, vol. 4, Issue 1 (Feb. 2004), pp. 83-123, ISSN: 1533-5399.

(Continued)

*Primary Examiner*—Harry S. Hong
(74) *Attorney, Agent, or Firm*—Winston & Strawn LLP

(57) ABSTRACT

The present invention provides systems, methods, and apparatus for semi-stateless scalable and distributed management of telephone hunt group features in a PBX. In particular, the invention conducts an auction-like phone call handling process in which phone handling decisions are partially delegated from a central resource to the individual client agents. Briefly, phone handling functions offer available call to agents who then decide which available calls to handle. This auction-like process is preferably implemented using broadcast (or multicast) messaging features so that system components do not need to know or access global state information. Messaging is preferably built on a selected instant messaging protocol.

20 Claims, 9 Drawing Sheets

U.S. PATENT DOCUMENTS

| | | | |
|---|---|---|---|
| 6,442,268 B1 | 8/2002 | Klaghofer et al. | 379/229 |
| 6,529,502 B2 | 3/2003 | Sarkissian et al. | 370/353 |
| 6,560,222 B1 | 5/2003 | Pounds et al. | 370/353 |
| 6,587,556 B1 | 7/2003 | Judkins et al. | 379/219 |
| 6,625,141 B1 | 9/2003 | Glitho et al. | 370/352 |
| 6,633,848 B1 | 10/2003 | Johnson et al. | 704/277 |
| 6,766,012 B1 | 7/2004 | Crossley | 379/265.02 |
| 6,816,589 B2 | 11/2004 | Pinard | 379/265.01 |
| 6,836,480 B2 | 12/2004 | Basso et al. | 370/390 |
| 6,836,893 B2 | 12/2004 | Pinard | 719/317 |
| 7,003,091 B1* | 2/2006 | Burns et al. | 379/265.11 |
| 7,039,411 B2 | 5/2006 | Purdy et al. | |
| 7,180,888 B1 | 2/2007 | Crouch et al. | 370/352 |
| 2003/0035528 A1 | 2/2003 | Baker | 379/207.04 |
| 2005/0238157 A1 | 10/2005 | Shaffer et al. | 379/211.01 |
| 2006/0140176 A1 | 6/2006 | Farris et al. | 370/352 |
| 2006/0195585 A1 | 8/2006 | Samayamantry | 709/227 |
| 2006/0252444 A1 | 11/2006 | Ozugur | 455/519 |

FOREIGN PATENT DOCUMENTS

| | | |
|---|---|---|
| EP | 641112 | 7/1994 |
| EP | 1035718 | 3/2000 |
| WO | WO 9718661 | 5/1997 |
| WO | WO 9918697 | 4/1999 |

OTHER PUBLICATIONS

Business Wire, "NEC America, Inc. and Cisco Systems, Inc. Demonstrate Feature Transparent Voice over IP PBX Networking", in Business Wire, pp. 0142, Feb. 11, 1999.

Business Wire, "Essential Communications Announces Its Highest Capacity 32Port HIPPI Switch (with Hunt Group Definition and Troubleshooting]", Business Wire, pp. 5040233, May 4, 1998.

Caporuscio, M., et al., "Design and evaluation of a support service for mobile, wireless publish/subscribe applications [via networking and multipartyinstant messaging, electronic auctions]", Transactions on Software Engineering, IEEE Transactions, Dec. 2003, vol. 29, Issue 12, pp. 1059 1071.

Communications News, "Conversant software [networking] solves communications and productivity problems with fourth generation PBX", Communications News, vol. 22, No. 7, pp. 56, Jul. 1985.

EDGE, "Ethernet: Lucent Technologies Unveils Cajun P120 Workgroup [Hunt Group] Switch," EDGE Work-Group Computing Report, Page: NA, Apr. 19, 1999. Gale Group PROMT®. Dialog® File No. 16 Accession No. 6279610.

EDGE1995, Ascom Timeplex unveils ST-20 . . . featuring standalone branching with . . . hunt-group capability for help desks (Product Announcement)], in EDGE, on & about AT&T, vol. 10, No. 364, p. 37(1), Jul. 17, 1995. Gale Group Trade and Industry Database™, Dialog® File No. 148 Accession No. 8081315.

EDGE1996, "Hypercom advances migration to new WAN technologies [supporting Hunt Group and Call Negotiation]," (Product Announcement), in EDGE: WorkGroup Computing Report, vol. 7, p. 19(1), Apr. 8, 1996. Gale Group Trade and Industry Database™. Dialog® File No. 148 Accession No. 8661192.

Jiang, Wenyu, et al., "Integrating Internet telephony services [via networking, instant messaging]," Internet Computing, IEEE Publication Date: May-Jun. 2002, vol. 6, Issue: 3, pp. 64-72, ISSN: 1089-7801. Digital Object Identifier: 10.1109/MIC.2002.1003133. Posted online: Aug. 7, 2008 00:52:07.0.

Kaplan, C. A., "Integrated messaging services inan ISDN PBX network," IEEE Conference Publication, n 288, 1988, p. 201-205, 1988. Ei Compendex® Dialog® File No. 278 Accession No. 5775289.

Ludwig, L.F., "Integration of CAD/CAE with multimedia teleconferencing and messaging via broadband networks and shared resources servers," Systems Integration, 1990. Systems Integration '90., Proceedings of the First International Conference, Date: Apr. 23-26, 1990, pp. 136-143.

Milstead, R.M., et al., "The digital PBX: current and future views of applications for [networking] information management," Conference on Private Switching Systems and Networks, 1988, Publication Date: Jun. 21-23, 1988, pp. 93-98, INSPEC Accession No. 3239158, Postedonline: Aug. 6, 2002 15:56:19.0.

PB12005, "ShoreTel Releases New Capabilities for Distributed Enterprises and International Offices [with Hunt Group and Unified Messaging]," in PB1- TELECOMTACTICS INSIDER, Feb. 15, 2005. World Reporter. Dialog® File No. 20 Accession No. 40684664.

PRNEWSWIRE, "Inter-Tel Announces Small-Office IP . . . [with PBX Hunt Group] Newtorking System," in PR NEWSWIRE, Jun. 22, 2000. World Reporter. Dialog® File No. 20 Accession No. 11618675.

PRNewswire2002, "New VNCI Video Technology Delivers Maximum Efficiency and Connectivity [with Circular Hunt Group Technology]," PR Newswire, p. NETU01605032002, Mar. 5, 2002. Gale Group PROMT® Dialog® File No. 16 Accession No. 9490114.

Yin, Min, "Voice menu navigation . . . with [instant messaging] crossdevice user experience integration," Symposium on User Interface Software and Technology, Proceedings of the 18th annual ACM symposium on User interface software and technology, pp. 187-190 (2005) ISBN: 159593-271-2.

* cited by examiner

Huntgroup in Typical PBX

SYSTEMS AND METHODS FOR SCALABLE HUNT-GROUP MANAGEMENT

FIELD OF THE INVENTION

The present invention is related to the field of telecommunication, particularly to private branch exchange (PBX) functions, and more particularly to hunt-group management features implemented with a PBX.

BACKGROUND OF THE INVENTION

Private branch exchanges (PBX) provide local call routine services. For example, may use a PBX to provide access from a smaller number of externally visible phone numbers to a larger group of internal phone numbers which may or may not be externally visible. In many situations it is additionally desirable to provide largely automatic access to two or more groups of internal phone numbers where the individuals in each groups have different specialized skills. This functionality, especially when implemented in a service organization or a call center, is known in the art as "hunt group" (HG) management. Recently, organizations have undergone changes during which at one time they may be smaller while at another time larger, or vice versa. Further, organizations now employ call centers and the like spread across different continents. Therefore, scalable and distributed hunt group management can be particularly useful However, HG management in many of today's PBXs is neither scalable nor distributed. FIGS. 1 and 2 illustrate the hardware and software (respectively) of a typical current HG management facility. Turning to FIG. 1, typical hardware includes one or more computer processors 101 interconnected by network links 103 which service one of more agent work stations. Although calls can be received at locations throughout this system, there is a single computer processor 109 and attached, unshared database 111 at which are made makes all call routing decisions. The database usually includes a queue of calls being handled by the system. FIG. 2 illustrates a typical call handling process which is executed on processor 109. The illustrated process is single threaded and concentrates all call handling decisions for the entire system in steps 201. Often data sharing problems require that only a single instance of this process can run on processor 109 at one time.

It is apparent that although this typical system appears to be scalable and distributed, in fact, it is not because of the single point of contention at processor 109 and database 111. Such a system does not meet the need for a scalable, distributed hunt group management system.

SUMMARY OF THE INVENTION

The present invention provides systems, methods, and apparatus for semi-stateless scalable and distributed management of telephone hunt groups preferably based on instant messaging communication protocols. Aspects which contribute to these advantages include partially delegating phone handling decisions from a central resource to the individual client agents. Briefly, phone handling functions in an auction-like manner in which hunt group servers offer available call to agents who then decide which available calls to handle. In preferred embodiments, call handling decisions are conditioned by call priority, call skill requirements, and available agent skills. Another aspect is that this auction-like process is implemented using broadcast (or multicast) messaging features in which a transmitter transmits a message to all listeners but only those listeners to which the message is relevant receive and act on the message. Accordingly, system components do not need to know or access global information defining the network and its current participants. This is delegated to routine and well known network routing processes.

In more detail, the present invention provides hunt group (HG) management systems for transferring telephone calls to agents belonging to a HG, the system including: one or more network connected HG server computers executing one of more instances of HG server software; and a plurality of (agent work stations including) network connected agent computers executing instances of agent software, the server and agent software instances exchanging broadcast and unicast messages, where an HG server software instance for an HG with one or more ready agents and waiting calls unicasts a call-post message to the agent software instance of a selected ready agent informing the selected agent of a call waiting to be handled, where the agent software instance of an agent that has previously received one or more call-post messages broadcasts a call-acknowledgement message to the HG server instances informing that the agent has selected a call from the received call-post message, and where an HG software instance, upon receiving a broadcast call-acknowledgement message of a previously unicast call-post message, transfers the call to the agent to which the previous call-post message was unicast.

Further aspects of the invention include systems where HG server software instances broadcast to the agent software instances readiness-inquiry messages, and where agent software instances, if the agent is ready to handle a call, respond to readiness-inquiry messages by broadcasting readiness-response messages; systems where an agent software instance, upon completing a transferred call, broadcasts a readiness-notification message to the HG server software instances systems where the HG server software instances and the agent software instances exchange broadcast and unicast messages according to an instant messaging protocol; and systems where at least one HG server software instance transfers calls to two or more agent software instances.

Further aspects of the invention include systems where at least one agent software instance receives transferred calls that belong to two or more HGs, the calls being transferred by one or more HG server software instances; systems where calls belonging to at least one HG are transferred by at least two HG server software instances; systems for transferring calls belonging to at least two separate HGs where HG server software instances for at least two separate HGs receive messages broadcast by agent software instances for agents in any of the at least two separate HGs; and systems for transferring calls belonging to at least two separate HGs where agent server software instances for agents belonging to least two separate HGs receive messages broadcast by HG server software instances for any of the at least two separate HGs.

The present invention also provides methods for an instance of server software for managing of a hunt group (HG) that cooperates with agent software instances for transferring telephone calls to agents belonging to the HG. The methods include the steps of broadcasting readiness-inquiry messages to agent software instances, receiving broadcast readiness-response messages from agent software instances indicating that the broadcasting agent is ready to handle a call, selecting a waiting call and a ready agent to handle the selected call, unicasting a call-post message to the software instance of the selected agent informing that the selected call is available to be handled, and receiving a broadcast call-acknowledgement message from an agent software instance informing of a readiness to handle a previous call-post message; and transferring the posted call to the acknowledging agent.

Further aspects of the methods of the invention include broadcasting again a readiness inquiry message and if, during a predetermined first time interval after broadcasting a prior readiness-inquiry message, no readiness-response message has been received, or if, during a predetermined second time interval after unicasting a call-post message, either no acknowledgement message has been received or an acknowledgement message has been received but not for the previously posted call; prior to the step of broadcasting a readiness-inquiry message, waiting for one or more calls to become available for transfer to an agent; prior to the step of broadcasting a readiness-inquiry message, waiting for an indication that a new call is ready to be transferred or an indication that an agent has become ready to handle a new call; and selecting a ready agent to handle a call if the agent has skills suitable for handling the call.

Further aspects of the methods of the invention include receiving readiness-response broadcast messages and call-acknowledgment broadcast messages from a plurality agent software instances for agents belonging to at least two different and separate HGs.

The present invention also provides methods for an instance of agent software for an agent belonging to a hunt group (HG) that cooperates with server software instances for transferring telephone calls belonging to the HG to an agent. The methods include the steps of receiving one or more unicast call-post messages informing of calls available to be handled, selecting one of the available calls to handle, broadcasting a call-acknowledgement message that the selected will be handled, receiving in transfer and handling the acknowledged call, and signaling that the agent is free to handle a new call.

Further aspects of the methods of the invention include, after receiving a first unicast call-post message, waiting for a selected period of time for further unicast call-post messages; and receiving a readiness-inquiry message; and then broadcasting a readiness-response message if the agent is free to handle a call; and, if calls are assigned priorities, where an agent selects for acknowledgement a higher priority call in preference to a lower priority call.

Further aspects of the methods of the invention include receiving call-post response messages for agent software instances from a plurality HG server software instances managing calls belonging to at least two different and separate HGs.

Headings are used herein for clarity only and without any intended limitation. A number of references are cited herein, the entire disclosures of which are incorporated herein, in their entirety, by reference for all purposes. Further, none of the cited references, regardless of how characterized above, is admitted as prior to the invention of the subject matter claimed herein.

BRIEF DESCRIPTION OF THE DRAWINGS

The present invention may be understood more fully by reference to the following detailed description of the preferred embodiment of the present invention, illustrative examples of specific embodiments of the invention and the appended figures in which.

DETAIL DESCRIPTION OF THE PREFERRED EMBODIMENTS

Figure 1:
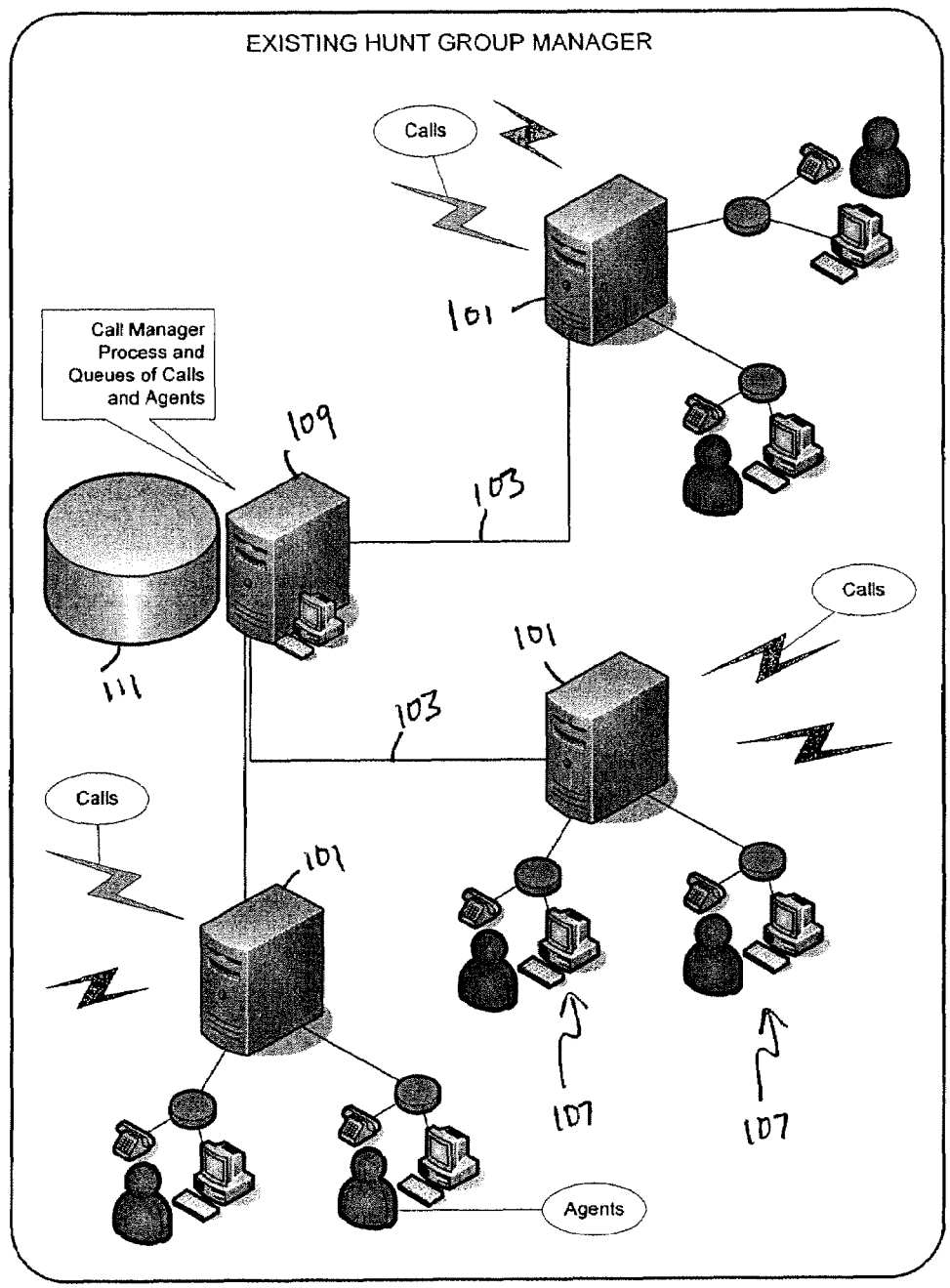
FIGS. 1 and 2 illustrate hunt group management in a prior art PBX.
Figure 2:
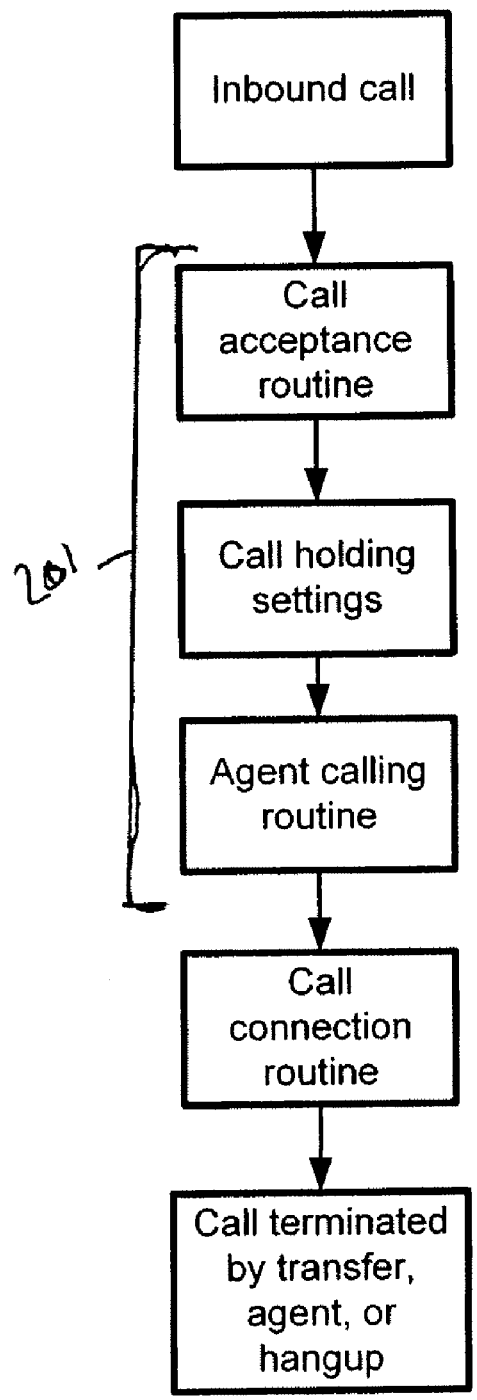

In the following hardware and software structures of preferred embodiments are first described followed by their methods of operations Preferred Structures of the Present Invention The system includes, inter alia, of the one or many hunt group servers ("HGS"), one or many instant messaging servers ("IMS"), one or many call routing servers ("CRS"), one or many data access servers ("DAS"), one or many dedicated or distributed data stores ("DS"), one or many phone gateways ("PG") which may be manufactured by Cisco, Lucent or some other vendor and one or many clients agents ("CA") having client software operating on a client computer ("CS") and one or more clients phones ("CP"). Each hunt group ("HG") has a unique id (hg-id); each client agents has a unique id (agent-id); and each call has as unique id (call-id). A present skill level ("SL") is defined for each client agent with respect to each hunt group.

Distributed-data stores include data storage hardware, which could be computer hard drive, flash drive, network addressable storage ("NAS") or any other data storage device from EMC Inc, Sun Inc. or other vendor data stores, and data management software i.e. data-base management system software from MySQL, Oracle or other software vendor, file system.

Each hunt group server includes computer hardware ("CH") which could be for example desktop, notebook, workstation or server manufactured by Dell, HP or other vendor and software having a interactive voice response ("IVR") module, a call processing module ("CPM"), a data exchange module ("DEM"), a hunt group process module ("HGM"), a messaging module ("MM"), and a authentication and authorization module ("AAM"). Hunt group server is a main logical element of the system and responsible for authentication of calls and agents, paying relevant audio prompts, processing its portion of call distribution.

Each call routing server includes computer hardware and software having a call routing module ("CRM"), a data exchange module, an authentication and authorization module, a phone registration module ("PRM"), and a messaging module. Call routing server is responsible for routing calls to the appropriate destination, authentication and authorization of calls and agents, keeping states of all calls it manages, updating call accounting records and updating agents' status.

Each instant messaging server includes computer hardware and software which may be implementation of XMPP, OSCAR, Simple or any other messaging protocol and come from Jabber Foundation, Jabber Inc, IPTEL.org or any other vendor. It should include a data exchange module, a message handling module ("MHM"), an authentication and authorization module, and a presence manager module ("PMM"), and some kind of implementation of message exchange protocol. It provides convenient media for data exchange between hunt group servers and client agents, authenticates and authorizes agents and servers, publishes agents' status.

Each data access server includes computer hardware and software having a data access module (DAM), and an authentication and authorization module and data exchange module. It serves as a proxy between data management software on DS and DEMs of different servers. Reference implementations may use LDAP, ODBC or some other protocol for data access.

All communications between components may or may not be encrypted.

The above mentioned servers could utilize the same physical computer hardware or different physical computer hardware that can be installed in one or several locations. Any of the above mentioned servers could be installed alone or together with any other servers (i.e. share or not share the same computer). In case of a distributed installation, i.e. on several different computers, each server should be able to access all other servers in the system using, preferably an IP-based protocol.

Each instant message contains the sender's signature and is uniquely identifiable.

Each client agent is connected to one or more instant messaging servers, and each client phone is registered with one or more call routing servers.

Figure 3A:
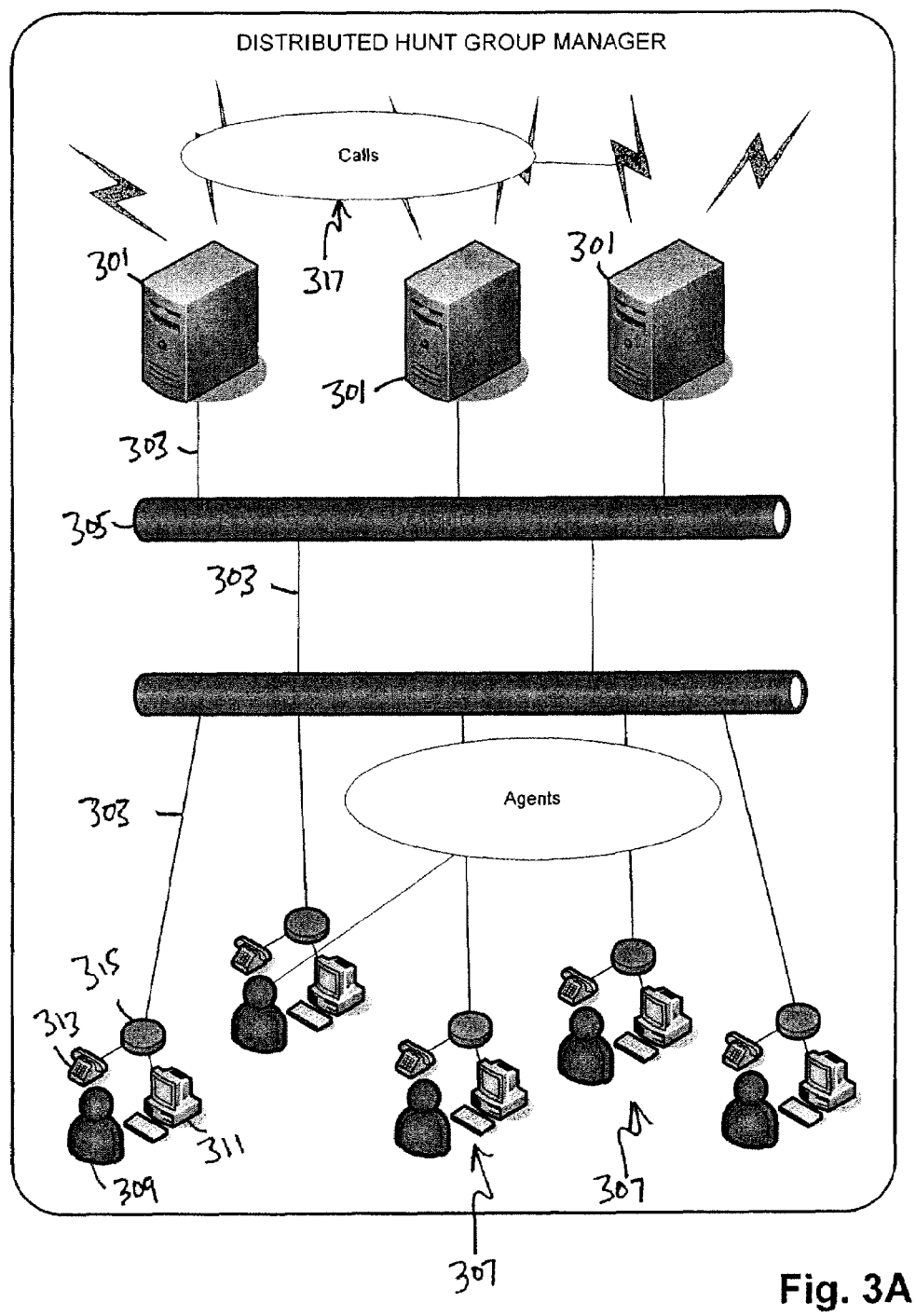
FIGS. 3A-B illustrate a structure of the present invention.

FIG. 3A generally illustrates an exemplary embodiment of the above-described hardware components. It should be understood that the icons used in this figure are to be taken as illustrative but not limiting. The server-side software components can run on one or more of computer hardware 301, e.g., desktop, notebook, workstation or server computers. This computer hardware includes, or is attached to, phone line interfaces 317 which can receive digitally encoded calls or encode analog calls. The computer hardware is attached via network links 303 to computer network interconnect 305 so that all hardware components can intercommunicate. The network links typically include routers, switches, hubs, and the like (not illustrated), and has sufficient bandwidth to transmit digitized phone calls without significant breaks. Individual client agents 309 work at agent stations 307 which include phone 313 and agent computer hardware 311. Equipment at the agent station is linked to the network through hub 315 and network link 303.

The preferred network connectivity, as illustrated, allows intercommunication between and among all server computer hardware 301 and between al server computer hardware 301 and all agent stations 307. Accordingly, each agent station 307 can transmit broadcast (and multicast and unicast) messages to all server computer hardware 301; and all server computer hardware 301 can transmit broadcast (and multicast and unicast) messages to all agent stations 307. Further, the physical locations of the elements of this system are limited only by the available network links. Therefore, these elements can be, for example, collocated in a single building or distributed across continents.

It can be appreciated from this figure that there is no central hardware resource that is required for the handling of each and every call. Call handling can be distributed across the number of network-interconnect hardware resources necessary to achieve a desired throughput.

Figure 3B:
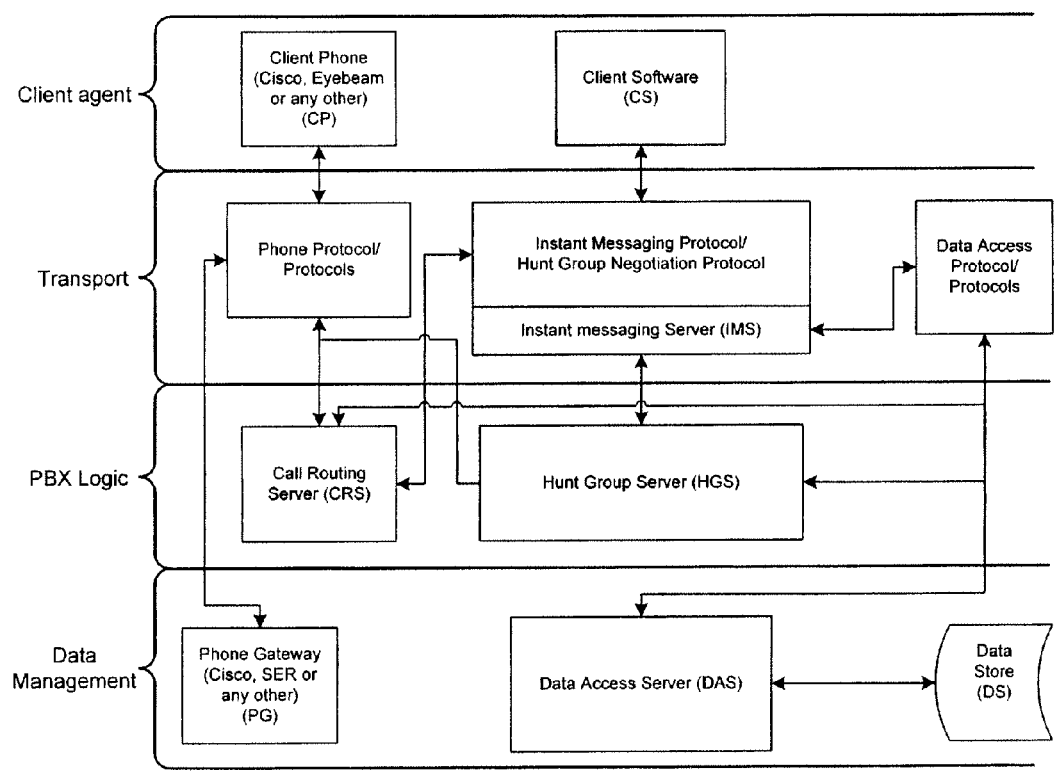

Next, FIG. 3B generally illustrates an exemplary embodiment of the above-described software components. It should be understood that a particular embodiment can include single or multiple instances of any of these software components. In this figure, these components are arranged into a number of functional layers. The data management layer handles storing and retrieving data used by the other software elements. It includes a data store (e.g., a computer storage system) accessible through data access server(s) (e.g., a database or a file system). These components are routinely available in the art. Also included in this layer, is the phone gateway which is the interface between this system and the external telephone system. Such gateways are known and available in the art. The PBX logic layer handles server-side call handling logic and includes call routing servers and hunt group servers, both of which are subsequently described. The PBX logic and data management layers are known as the server side.

The client agent layer presents the system interface to the individual agents and is known as the client side. Inter alia, it present calls available for the agent to handle, communicates the agents choice of call to handle, and maintains the agent's status. This layer includes a client phone which may be any of the routinely available legacy or digital phones and the client software which is subsequently described.

The transport layer links the server side with the client side and is preferably built from known and standardized components. System data is transported using known distributed data access protocols, such as those described above. Phone calls and phone call information is transported using known phone call protocols, such as those described above. Messages can be passed between the client and server sides using many known communication protocols. For example, a suitable messaging system can be built using only IP and TCP services. Preferably, messages are transported using a known instant messaging protocol which already provides features useful in this invention. Such features include presence information and useful message header information. Typically, present information includes which network elements are currently present on the network for communication. Useful message header information includes sender/receiver identification, unique identification of each message and facilities for message logging.

Preferred Methods of Operation of the Present Invention

Prior to describing the methods of operation of the present invention in detail, the following, which has also been explained above, should be understood. First, it should be understood that the systems and methods of the present invention operate within the ambit of a private branch exchange ("PBX") to provide hunt group services. Briefly, hunt-group services include assign calls incoming to an organization to those available individuals who are most capable of handing the calls. For this purpose, individuals (individual agents) are assigned to one or more hunt groups ("HG") according to their skills so that each HG includes individual with similar skills, e.g., sales skills, support skills, administration skills, and the like. A single individual with multiple skills can be assigned to multiple HG's. Then, when an incoming call is received, its nature is first ascertained, e.g., related to sales, or to support, or to administration, and then it is directed to an appropriate server program instance for relevant hunt group, a hunt group server instance ("HGS" instance), which transfers it to an individual agent in the appropriate HG.

Further, it should be understood that the term "hunt group" is used herein in several different contexts and that its meanings in different contexts can be different. Table 1 described the principal contexts and meanings.

TABLE 1

Hunt group terminology

| USE CONTEXT | MEANING |
|---|---|
| "individual agent" or "agent" | an actual individual who handles incoming phone calls |
| "agent's computer hardware" | the hardware which an individual agent uses to interact with the present invention (preferably, at least a networked computer and a networked phone) |
| "agent software instance" or also "agent" | an instance of the software of the present invention which interacts with an individual agent and which usually runs on agent hardware |
| "hunt group" ("HG") | a group of individual agents who have similar skills (but perhaps of different levels) and are therefore capable of handling calls of a given nature |
| "hunt group server instance" or "hunt group server" ("HGS") | an instance of the software of the present invention which manages a given hunt group, that is it receives calls that a suitable handed by its managed hunt group and finds an individual agent to handle the call |
| "hunt group server computer" or also "hunt group server" | a computer (i.e., at least a processing unit and storage) on which a hunt group server instance runs |

Figure 4:
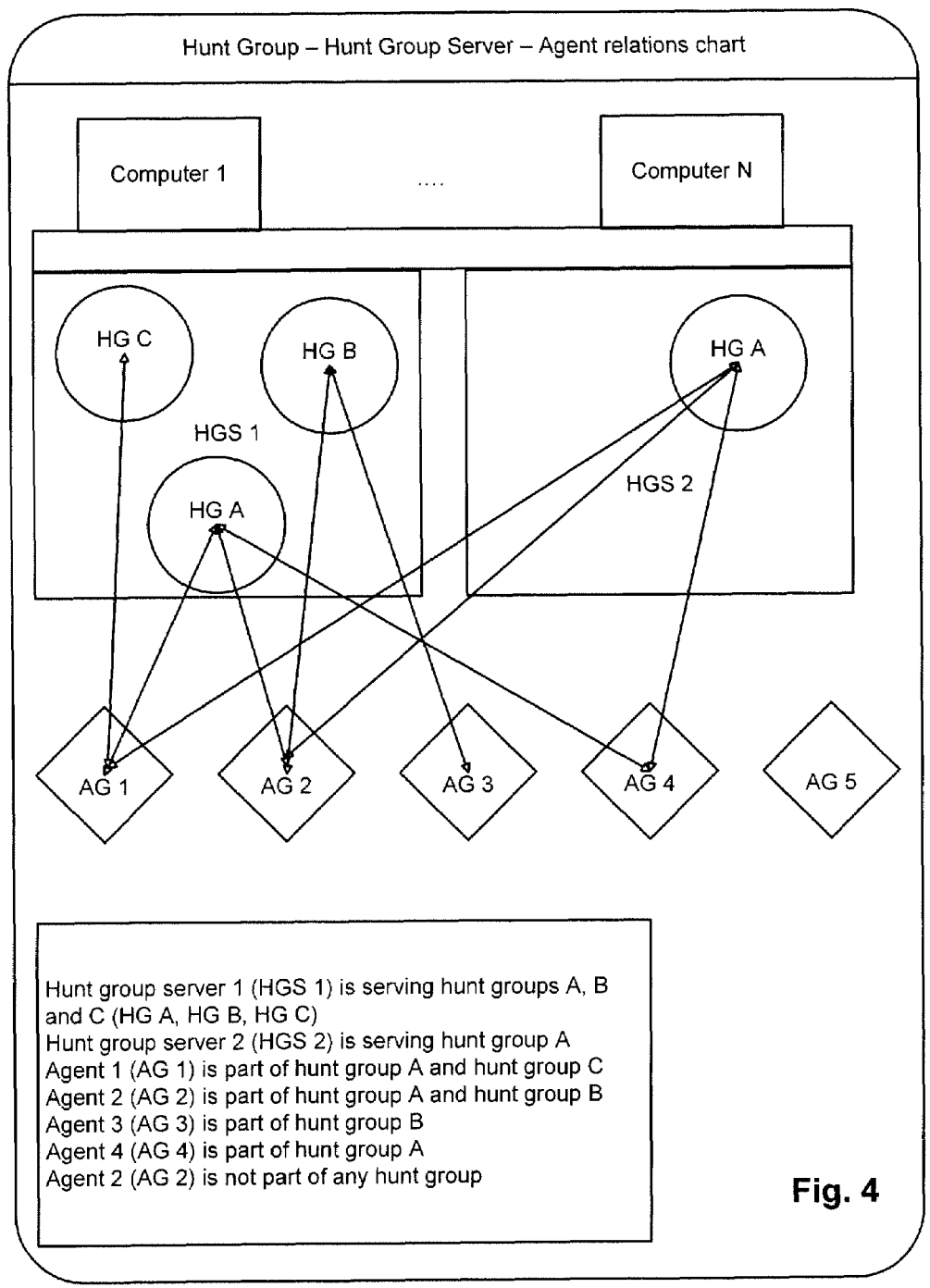
FIG. 4 illustrate in overview how an incoming call is handled.

With reference to FIG. 4, in many embodiments, individual agents, HG's, and HGS instances can be in a many-many-many relationship. For example, an individual agent with a single skill set can be in a single HG, while an individual agent with multiple skill sets can be in multiple HGs. Correspondingly different HG's can overlap by including common individual agents. Further, a single HGS instance can service a single HG or two or more HG's and HGS instances can be replicated. Therefore, a single HG can be served by multiple, independent HGS instances, and a single HGS instance can service multiple HG's. Finally, although each HGS instance runs on a single HGS computer, because of the above relations, a single HGS computer can service multiple HG's and multiple agents, and conversely, a single agent can be serviced by multiple HGS instances on multiple HGS computers.

In FIG. 4, the two illustrated HGS instances, HGS1 instance and HGS2 instance, can run on any one or two of computer 1 to computer N. HGS1 instance services three hunt groups, HG A, HG B, and HG C, while HGS2 instance services only HG A. Therefore, HG A is serviced by both HGS1 instance and HGS2 instance, but HG B and HG C are serviced only by HG1. Turning to the individual agents, it can be seen that Agent 1 is part of HG A and HG C; Agent 2 is part of HG A and HG B; Agent 3 is part of only HG B; Agent 4 is part of only HG A; and Agent 5 is currently not assigned to any hunt group. In brief, each agent can be part of multiple hunt groups, and each hunt group can include multiple agents.

Turning now to the preferred methods of operation of the present invention, it can generally be considered that these methods are based on an auction paradigm, namely, a call auction paradigm. From the point of view of a HGS instance, generally it can be considered that each HGS instance auctions incoming calls that it receives, and that the individual agents in the HG are participants in this auction. The HGS instance present each the opportunity to handle each incoming call to the individual agents in the HG, and individual agents that are ready can decided whether or not to handle a new incoming call. Preferably, an individual agent's decision is based on characteristics of the call. For example, a call requiring a high skill level should only be handled by individual agents having a high skill level; or a call of higher priority should be handled before a call of lower priority.

For the point of view of an individual agent, the agent participates in at least one auction and can participate in multiple overlapping auctions. The individual agent participates in the auction directed to its HG by at least one HGS instance serving that HG, and generally, participates in auctions directed to that HG by all the HGS instances (if more than one) serving that HG. Since individual agents can belong to two or more HGs, such agents then participate in at least one auction (and usually all the auctions) directed to the HGs to which they belong.

A further feature of the present invention is that the multiple auctions are preferably implemented in a manned so that their call processing throughput can be readily scaled over a large range. Preferred implementations maintain little or no global state information (referred to herein as "stateless") so that, therefore, increases in processing concurrency lead to generally proportional increases in call processing throughput. Also, preferred implementations are structured into a variable number of independent processes so that processing concurrency is limited only by the number of hardware processing units. For example, each HGS instance preferably includes one or more separate software processes so that the degree of concurrency of the HGS instances is simply proportional to the number of independent processing units in the HGS computers that host the HGS instances, and further, their degree of concurrency can be scaled up by simply added more HGS computers. Further, since the individual agents are preferably supplied with their own agent computer hardware, all agent software processes can operate concurrently and can scale as new agents are added.

Although the generally stateless and variably concurrent implementation is preferred, it should not be considered as limiting. Hunt group management structured as multiple possibly overlapping call auctions can be differently implemented as is apparent to one of ordinary skill in the art.

The generally stateless and variably concurrent preferred implementation is now described in more detail. The HGS server instances and the agent software instances communicate are coordinated by certain events but are otherwise independent processes. Coordinating events include: message receipt events, NOTIFY events, INCALL events, and timeout events. The server and software instances coordinate by exchanging messages, and from time-to-time can wait for receipt of a next message. Message receipt events signify that a message has been received. NOTIFY events signify that an agent has been ready and able to handle a new call, and are preferably signaled by specific messages. INCALL events signify that front-end call routing has delivered a new call to a particular HGS instance, and are preferably signaled by some form of inter-process communication between the front-end and the HGS instances. Finally, timeout events are used to prevent a process from indefinitely waiting for a too-long delayed event. They improve the robustness of the present invention.

Messages that are recognized by message receipt events are of a number of types. Table 2 outlines important message types and their contents.

TABLE 2

Message types and formats

| MESSAGE TYPE | ADDRESSING TYPE | CONTENTS | | | | |
|---|---|---|---|---|---|---|
| | | MESSAGE ID. | HUNT GROUP ID. | AGENT ID. | CALL ID. | PRIORITY (CALL/AGENT) |
| GET (get agent) | broadcast | X | X | | | |
| POST (post call) | unicast | X | X | | X | X |
| NOTIFY (free agent) | broadcast | X | X | | | |
| READY | broadcast | X | X | X | | X |
| ACK (ack call) | broadcast | X | | | X | |

Preferably, entities are represented by unique identifiers ("id."): each hunt group by a hunt group id (hg-id); each individual agent by an agent id.; each call by a call id.; each message by a message id.; and so forth. As well as being a unique identifier, message ids. can also include information useful to the messaging system used to transmit messages, e.g., authorization information, authentication information, routing information, and the like. The priority field can also include information beyond importance of an incoming call, e.g., skill level required for call, skill level of agent, priority of message agent is currently handling (if any), and so forth. These messages are also referred to herein with the following equivalent names: a GET message is also referred to as a readiness-inquiry message; a READY message is also referred to as a readiness-response message; a POST message is also referred to as a call-post message; an ACK message is also referred to as a call-acknowledgement message; and a NOTIFY message is also referred to as a readiness-notification message.

Concerning addressing types, as is known in the art, communication message can be, inter alia, of various send types, e.g., unicast, multicast, and broadcast, where unicast messages are directed to a single destination, multicast messages are directed to two or more but not all destinations, and broadcast ("b'cast") messages are directed to all destinations (in a particular communication domain). Unicast and multicast message generally require advance knowledge of destination addresses, while broad cast message do not require such advance knowledge.

Other than POST, which is of unicast to a particular agent, messages are broadcast type to all destinations. Thereby, the amount of addressing information of which processes must be aware is considerably limited. For example, HGS instances need to be aware only of their hg-id and of the addresses/identities of the agent software instances in their hunt group. All messages other than POST are broadcast to all listening software instances, which recognize relevant messages their hg-id matches the hg-id in the message. HGS instances are aware of their agent addresses/identities in order to more efficiently transfer individual call to individual agents in their own hunt groups. Agent software processes need to be aware of their hg-id in order to recognized relevant messages from their HGS instance. But these processes need retain no addressing information because all their messages to HGS instances are broadcast to all listening HGS instances.

So limiting addressing information also promotes flexible operation. Agent software instances can join and leave an operating system without overhead, i.e., without knowledge of any global system information. They make their presence known to HGS instances with a NOTIFY message (equivalently with a NOTIFY event). To join an operating system, HGS instances need only become aware of the current agent software instances in their hunt group, e.g., by query, access to global agent information, or by other means.

Figure 5A:
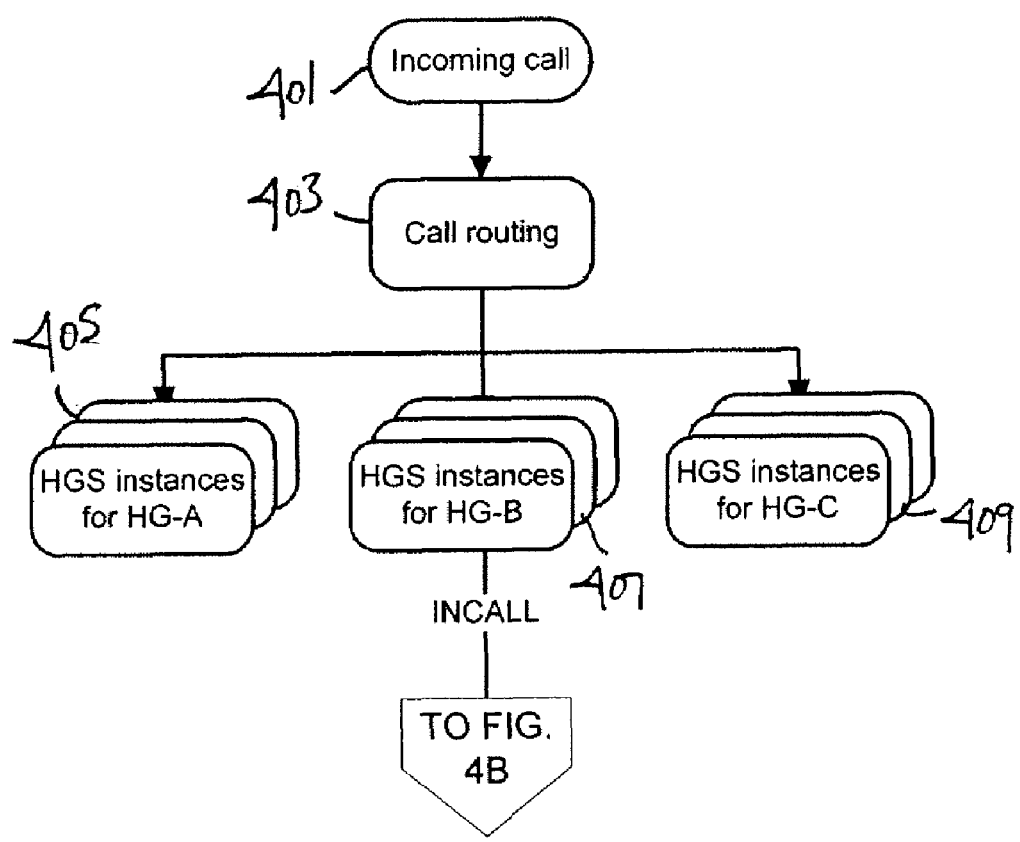
FIGS. 5A-B illustrates an HG server software implementation.
Figure 5B:
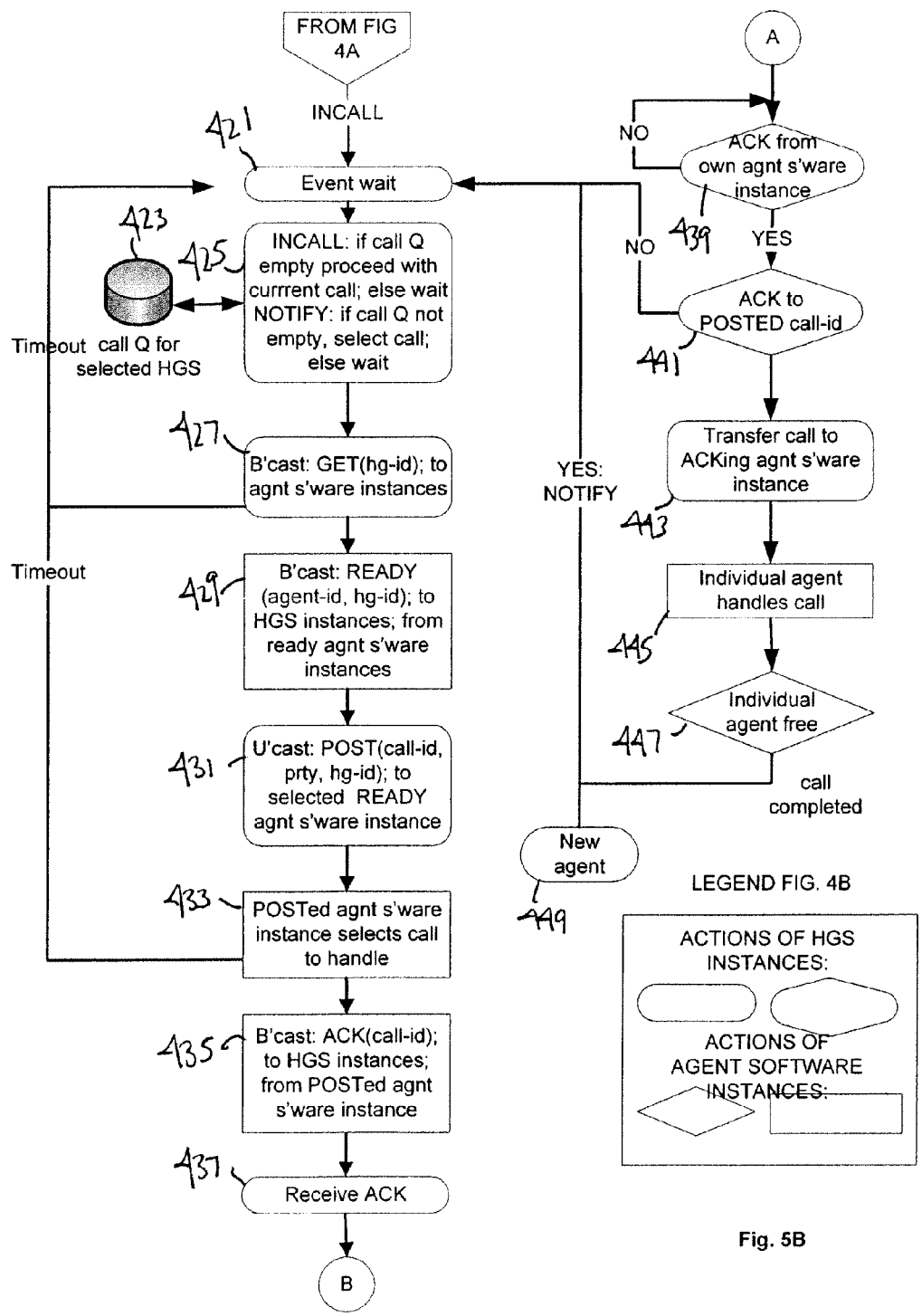
Figure 6:
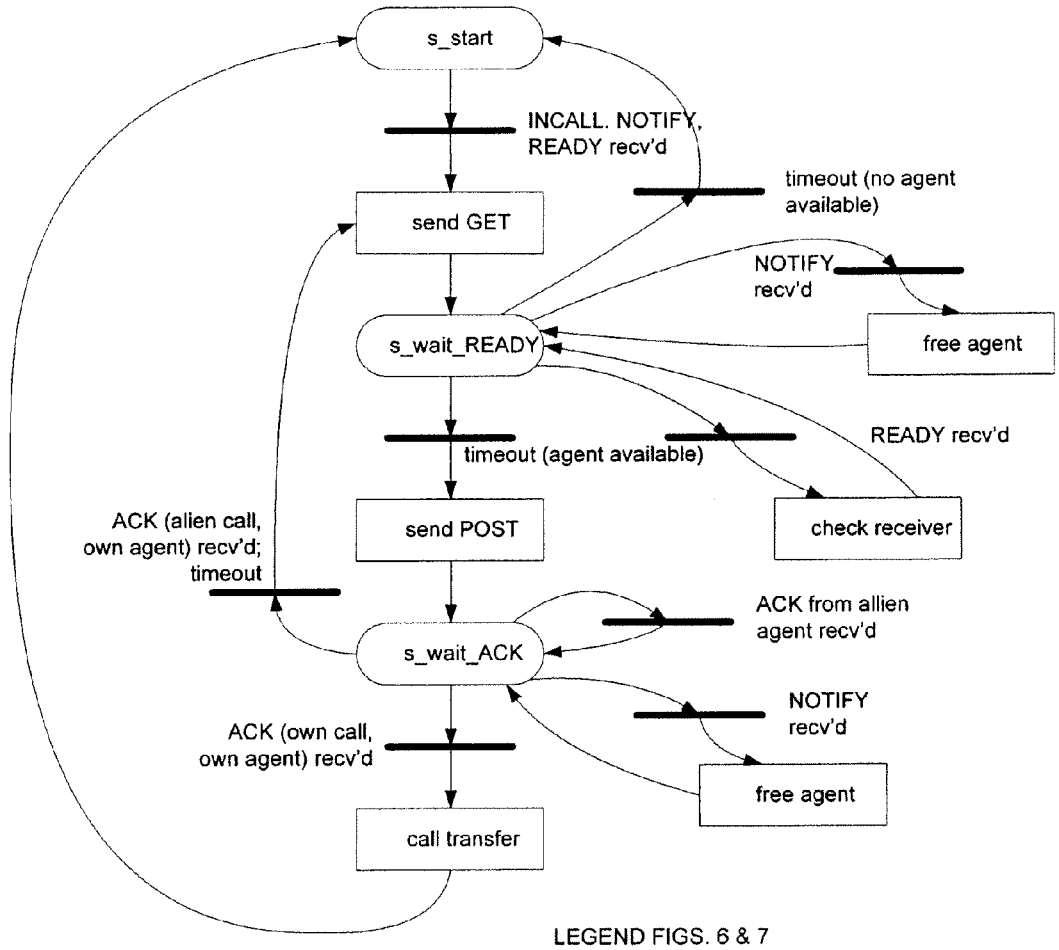
FIG. 6 illustrates a server agent software implementation.
Figure 6:
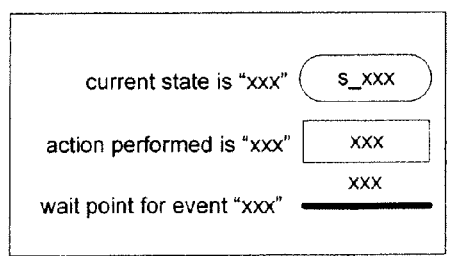

Next, a preferred implementation of HG server software and agent software is described in detail. FIGS. 5A-B illustrate a typical sequence of steps which take an incoming call and eventually transfers it to an agent. FIGS. 5 and 6 present state machine diagrams illustrating an HG server process and an agent software process. It should be understood that FIGS. 5A-B illustrate only a typical process. For convenience and to avoid clutter, these figures do not illustrate all possible call handling sequences. All possible handling sequences will be apparent from FIGS. 5 and 6 which illustrate the coordinated operation of HG server processes and agent software processes.

FIG. 5A illustrates that an incoming phone call is first received by the call routing servers which forward the call to one or more of the call routing servers. The receiving call routing servers, depending on the call destination and/or call origination information, validate the call against data stored in the distributed-data stores and accessed using the data access servers; and then directs call to the appropriate hunt-group servers. The call is also assigned a unique identifier, the call-id. For example, incoming call 401 is first handled by call routing process(es) 403 running on the call routing server(s). There may be one or many call routing server machines, and these machines may also HGS instances thereby also serving as HG computer servers. Based on available call information, call routing process determines that call 401 is best handled by HG-B and therefore directs an INCALL event to one or more (if more than one) HGS instances 407 for this HG running on a HG server computer. The illustrated embodiment also includes additional HGs and HGS instances 405 and 409 for these HGs.

FIG. 5B next illustrates the handling of a typical call, signaled by an INCALL event, by a particular HGS instance. The INCALL event starts from event wait 421 this HGS instance which receives the call and place it on call queue 423 for HG-B, the hunt group most suitable for the call. Each hunt group server instance has its own call queue, and therefore there is little or no contention for the call queues, such contention, if present, could limit scalability. The hunt-group server then further validates the call data against data stored in the distributed-data stores and accessed using the data access servers, and assigns a call priority according to the validation results. Next, if the call Q is empty, the HGS instance proceeds with the newly incoming call. Otherwise, if the call Q is not empty, the instance waits. Note that this condition occurs if there are no ready agents able to handle the queued calls.

The HGS instance can also be started by a broadcast NOTIFY event signaling that an agent has become free and is available to handle further calls. The broadcast NOTIFY message includes the hg-id of the newly free agents and is therefore of interest only to the HGS instances for the identified HG. An agent can become free 447 because handling of the current call is complete. An agent can also become free for other reasons, e.g., a fresh agent joins 449 the hang group. When a hunt-group server receives a NOTIFY message concerning the hunt group it is serving and there are calls waiting in a corresponding call queue, it selects 425 the call with maximum priority from a queue and sends a GET message for the hunt group.

The HGS instance next notifies the agents in its particular HG by broadcasting a GET message 427 with the id of the HG. Client agents in the HG identified in the GET message receive the GET message, and those that are not busy, broadcast READY messages 429 including the agents' own agent-id. as well as the hg-id of the HG to which the agent belongs. In case the agent belongs to multiple HGs, the READY message includes the ids of all the HGs to which it belongs. The READY message also includes a priority field which is used to hold the skill level(s) of the particular client agent. If a client agent is busy, it does not respond to the GET message. The busy or not-busy status is a part of the local state maintained by an agent software instance.

It should be noted that an HGS instance that has sent a GET message may not receive a reasonably prompt READY message because all agents are busy with calls from different HGS instances. In this case, after a selected timeout period, the HGS instance begins again processing from the event wait 421.

When a HGS instance receives one or more READY messages from client agents in one of the hunt groups it is serving, it selects 431 a ready agent to handle the current call. Preferably, the selected agent has the highest level of skill in handling the current call. The HGS instance then notifies the single, selected agent to handle the call by unicasting a POST message 431 only to the selected agent. The POST message includes the identifier of the call (call-id.), the identifier of the HG (hg-id.) to which the call has been assigned, and the priority of the call (priority). POST messages are not broadcast because it is only a single agent that is selected to handle the call.

An individual client agent, during a non-busy period, can receive POST message from two or more HGS server instances indicating different calls to handle. The individual client agent examines the available calls and selects 433 a particular call to handle, e.g., the call with the highest priority. If only a single POST message has been received, the client agent selects the call identified in that single message. Having selected a call, a POSTed agent software instance broadcasts an ACK message 435 containing the call-id of the selected call to all HGS instances.

Again, it should be noted that an HGS instance that has sent a POST message may not receive a corresponding ACK message because the POSTed agent has selected a call from a different HGS instance and no other agent have broadcast any READY messages. In this case, after a selected timeout period, the HGS instance begins again processing from the event wait 421.

Should the HGS instance receive an ACK message 437, it first checks 439 whether the ACK message is from an agent to which it has previously sent a POST message. It next checks 441 whether the ACK message includes a call-id that this HGS instance has previously POSTed. If not, the HGS instance can either again broadcast a GET message for any now-available agent or it can select the agent with the next highest skill level among the ready agents it already knows about. This next agent is then POSTed with the call.

If the ACK message includes the call-id that the previously POST message also included (that is the correct call is acknowledged), the call is transferred 443 to the ACKing client agent. When the client agent finishes handling the call 447 it publishes a "non-busy" status and sends NOTIFY messages to all hunt group which it can serve.

Figure 7:
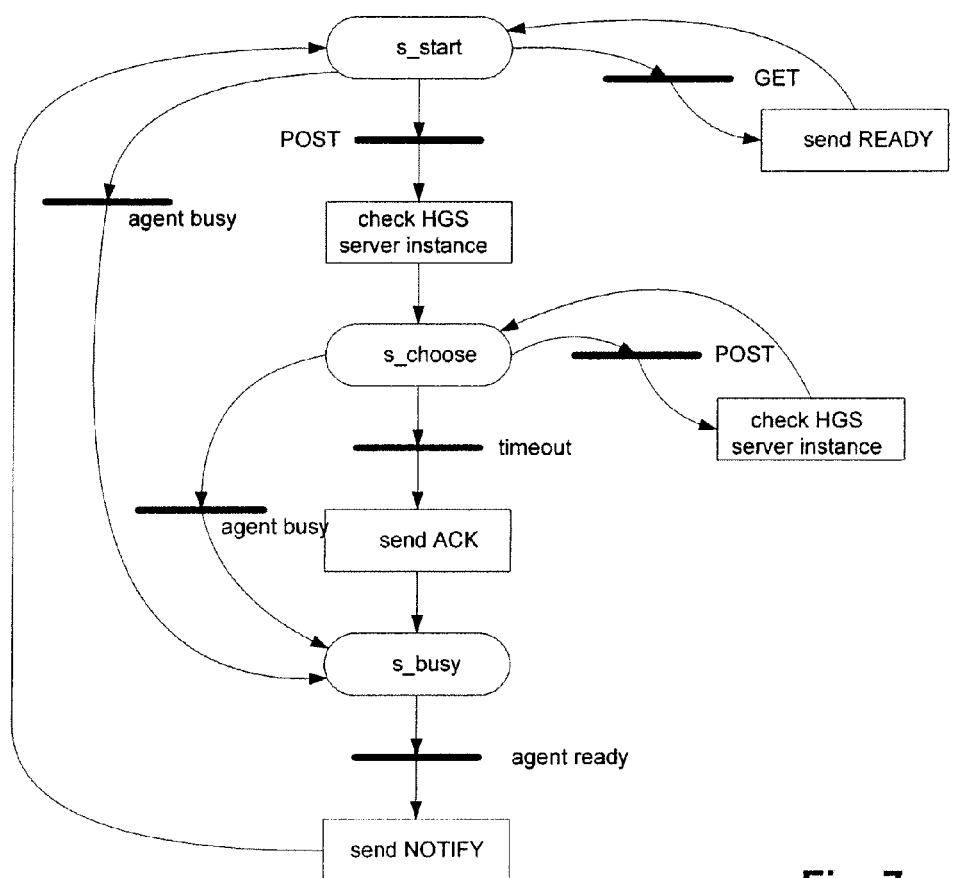
FIG. 7 illustrates a client agent software implementation.

Operation of an HGS instance and of a client software instance is most compactly and conveniently represented as state diagrams in UML-like format which are presented in FIG. 6 (for an HGS instance) and FIG. 7 (a client software instance). It should be understood that use of this descriptive format is not limiting and that these software components can be alternatively implemented. FIG. 6 includes a legend explaining the meaning of the symbols used in these figures. Generally, a software component is represented here as having states and transitions between the states. Transitions between two states take place upon occurrence of one or more selected evens, and when such a transition takes place, a selected action is performed.

TABLE 3

| COMP. | STATE | Software states DESCRIPTION |
|---|---|---|
| HGS | start | initial state from which call handling commences |
|  | wait_READY | waiting for a READY message |
|  | wait_ACK | waiting for an ACK message |
| client software | start | initial state from which call handling commences |
|  | choose | waiting for to choose from available calls |
|  | busy | agent is handling a call |

Turning to FIG. 6, it can be appreciated that, if there are no new calls or ready agents, an HGS instance is in a start state and waits until an INCALL, NOTIFY, or READY event is received. When such an event is received, the instance sends a GET message, enters the wait_READY state. While in this state, the instance can respond to READY messages 613 and NOTIFY events/messages 609 noting that an agent is available 611 and 615. The HGS instance exits the wait_READY state until timeout event and then, if no agent is available 619, enters again a start state or else proceeds to send a POST message 621 if an agent is available 617. After the post message, the instance enters a wait_ACK state waiting for an ACK message. If an ACK message is received from an agent not in the instance's HG, the instance resumes waiting for an ACK message. If an ACK message is received from an agent in the instance's HG but not for the POSTed call 627, the instance resumes sends a GET message 605 and proceeds. Finally, if an ACK message is received from an agent in the instance's HG and for the POSTed call 629, the instance transfers the call 635 to the ACKing agent and enters the start state. The instance can also respond 633 to NOTIFY message 631 received during the wait-ACK state.

Turning to FIG. 7, it can be appreciated that, from start state 201, if an agent software instance receives GET message 703, it responds with READY message 705. If it becomes busy 707, it transitions to busy state 725. Finally, if it receives unicast POST message 709, it checks 711 the originating HGS software instance, notes the POSTed call, and transitions to choose state 713. If it receives further POST message 715, it again notes the POSTed call and checks the originating HGS 717. And if it becomes busy 719, it transitions to busy state 725. During the choose state until the agent software instance exits at timeout 721, it notes all POSTed calls (if more than one). When the choose state is exited, the instance chooses the high priority message that has been posted to it and enters the busy state 725. The call is transferred to the individual agent who handles the call. When the individual agent finishes handling the call, the agent notifies the agent software instance which becomes ready 727. The instance then sends NOTIFY event/message 729 and transitions to start state 701.

The preferred embodiments of the invention described above do not limit the scope of the invention, since these embodiments are illustrations of several preferred aspects of the invention. Any equivalent embodiments are intended to be within the scope of this invention. Indeed, various modifications of the invention in addition to those shown and described herein, such as alternate useful combinations of the elements described, will become apparent to those skilled in the art from the subsequent description. Such modifications are also intended to fall within the scope of the appended claims. In the following (and in the application as a whole), headings and legends are used for clarity and convenience only.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

A number of references are cited herein, the entire disclosures of which are incorporated herein, in their entirety, by reference for all purposes. Further, none of the cited references, regardless of how characterized above, is admitted as prior to the invention of the subject matter claimed herein.

What is claimed is:

1. A hunt group (HG) management system for transferring telephone calls to agents belonging to a HG, the system comprising:
   one or more network connected HG server computers executing one of more instances of HG server software; and
   a plurality of network connected agent computers executing instances of agent software, the server and agent software instances exchanging broadcast and unicast messages,
   wherein an HG server software instance for an HG with one or more ready agents and waiting calls unicasts a call-post message to the agent software instance of a selected ready agent informing the selected agent of a call waiting to be handled;
   wherein the agent software instance of an agent that has previously received one or more call-post messages broadcasts a call-acknowledgement message to the HG server instances informing that the agent has selected a call from the received call-post message, and
   wherein an HG software instance, upon receiving a broadcast call-acknowledgement message of a previously unicast call-post message, transfers the call to the agent to which the previous call-post message was unicast.

2. The system of claim 1 wherein HG server software instances broadcast to the agent software instances readiness-inquiry messages, and
   wherein agent software instances, if the agent is ready to handle a call, respond to readiness-inquiry messages by broadcasting readiness-response messages.

3. The system of claim 1 wherein an agent software instance, upon completing a transferred call, broadcasts a readiness-notification message to the HG server software instances.

4. The system of claim 1 wherein the HG server software instances and the agent software instances exchange broadcast and unicast messages according to an instant messaging protocol.

5. The system of claim 1 wherein at least one HG server software instance transfers calls to two or more agent software instances.

6. The system of claim 1 wherein at least one agent software instance receives transferred calls that belong to two or more HGs, the calls being transferred by one or more HG server software instances.

7. The system of claim 1 wherein calls belonging to at least one HG are transferred by at least two HG server software instances.

8. The system of claim 1 for transferring calls belonging to at least two separate HGs wherein HG server software instances for at least two separate HGs receive messages broadcast by agent software instances for agents in any of the at least two separate HGs.

9. The system of claim 1 for transferring calls belonging to at least two separate HGs wherein agent server software instances for agents belonging to least two separate HGs receive messages broadcast by HG server software instances for any of the at least two separate HGs.

10. A method for an instance of server software for managing of a hunt group (HG), the server software instance cooperating with agent software instances for transferring telephone calls to agents belonging to the HG, the method comprising:
    broadcasting readiness-inquiry messages to agent software instances;
    receiving broadcast readiness-response messages from agent software instances indicating that the broadcasting agent is ready to handle a call,
    selecting a waiting call and a ready agent to handle the selected call;
    unicasting a call-post message to the software instance of the selected agent informing that the selected call is available to be handled; and
    receiving a broadcast call-acknowledgement message from an agent software instance informing of a readiness to handle a previous call-post message; and
    transferring the posted call to the acknowledging agent.

11. The method of claim 10 further comprising broadcasting a readiness inquiry message
    if, during a predetermined first time interval after broadcasting a prior readiness-inquiry message, no readiness-response message has been received, or
    if, during a predetermined second time interval after unicasting a call-post message, either no acknowledgement message has been received or an acknowledgement message has been received but not for the previously posted call.

12. The method of claim 10 further comprising, prior to the step of broadcasting a readiness-inquiry message, waiting for one or more calls to become available for transfer to an agent.

13. The method of claim 10 further comprising, prior to the step of broadcasting a readiness-inquiry message, waiting for an indication that a new call is ready to be transferred or an indication that an agent has become ready to handle a new call.

14. The method of claim 10 wherein a ready agent is selected to handle a call if the agent has skills suitable for handling the call.

15. The method of claim 10 further comprising receiving readiness-response broadcast messages and call-acknowledgment broadcast messages from a plurality agent software instances for agents belonging to at least two different and separate HGs.

16. A method for an instance of agent software for an agent belonging to a hunt group (HG), the agent software instance cooperating with server software instances for transferring telephone calls belonging to the HG to an agent, the method comprising:

receiving one or more unicast call-post messages informing of calls available to be handled;

selecting one of the available calls to handle, broadcasting a call-acknowledgement message that the selected call will be handled;

receiving in transfer and handling the acknowledged call; and signaling that the agent is free to handle a new call.

17. The method of claim 15 further comprising, after receiving a first unicast call-post message, waiting for a selected period of time for further unicast call-post messages.

18. The method of claim 15 further comprising:

receiving a readiness-inquiry message; and broadcasting a readiness-response message if the agent is free to handle a call.

19. The method of claim 15 wherein calls are assigned priorities, and wherein an agent selects for acknowledgement a higher priority call in preference to a lower priority call.

20. The method of claim 10 further comprising receiving call-post response messages for agent software instances from a plurality HG server software instances managing calls belonging to at least two different and separate HGs.

* * * * *

UNITED STATES PATENT AND TRADEMARK OFFICE
CERTIFICATE OF CORRECTION

PATENT NO. : 7,286,661 B1
APPLICATION NO. : 11/743088
DATED : October 23, 2007
INVENTOR(S) : Balk et al.

It is certified that error appears in the above-identified patent and that said Letters Patent is hereby corrected as shown below:

Title Page:
Item (56) References Cited, FOREIGN PATENT DOCUMENTS:
    EP 0510411, change "3/1992" to -- 10/1992 --.
    EP 641112, change "7/1994" to -- 03/1995 --.
    EP 1035718, change "03/2000" to -- 09/2000 --.
Item (56) References Cited, OTHER PUBLICATIONS:
    "Business Wire" reference (second occurrence), change "32Port" to -- 32-Port --.
    "Caporuscio" reference, change "multipartyinstant" to -- multiparty-instant --; and change "1059 1071" to -- 1059-1071 --.
    "EDGE1996" reference, change "WorkGroup" to -- Work-Group --.
    "Jiang" reference, change "Aug. 7, 2008" to -- Aug. 7, 2002 --.
    "Kaplan" reference, change "inan" to -- in an --.
    "Ludwig" reference, change "resources" to -- resource --.
    "Milstead" reference, change "Postedonline" to -- Posted online --.
    "PB12005" reference, change "PB12005" to -- PBI2005 --.
    "PRNEWSWIRE" reference, change "PRNEWSWIRE" to -- PR NEWSWIRE --; and change "Newtorking" to -- Networking --.
    "PRNewswire2002" reference, change "PRNewswire2002" to -- PR Newswire 2002 --; and change "Circular" to -- "Circular --.
    "Yin" reference, change "crossdevice" to -- cross-device --.

Column 13:
    Line 54 (claim 1, line 5), change "of" to -- or --.

Column 14:
    Line 38 (claim 9, line 3), before "least" insert -- at --.

UNITED STATES PATENT AND TRADEMARK OFFICE
CERTIFICATE OF CORRECTION

PATENT NO. : 7,286,661 B1
APPLICATION NO. : 11/743088
DATED : October 23, 2007
INVENTOR(S) : Balk et al.

It is certified that error appears in the above-identified patent and that said Letters Patent is hereby corrected as shown below:

Column 15:
Line 18 (claim 15, line 3), before "agent" insert -- of --.

Column 16:
Line 23 (claim 20, line 3), before "HG" insert -- of --.

Signed and Sealed this

Sixth Day of May, 2008

JON W. DUDAS
*Director of the United States Patent and Trademark Office*